United States Patent
Nishii et al.

(10) Patent No.: US 9,902,848 B2
(45) Date of Patent: *Feb. 27, 2018

(54) VINYL CHLORIDE RESIN COMPOSITION AND VINYL CHLORIDE RESIN MOLDED ARTICLE

(71) Applicant: Mitsubishi Chemical Corporation, Tokyo (JP)

(72) Inventors: Hiroyuki Nishii, Otake (JP); Shinya Hirai, Otake (JP); Mitsufumi Nodono, Otake (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/111,210

(22) PCT Filed: Jan. 15, 2015

(86) PCT No.: PCT/JP2015/050928
§ 371 (c)(1),
(2) Date: Jul. 13, 2016

(87) PCT Pub. No.: WO2015/108101
PCT Pub. Date: Jul. 23, 2015

(65) Prior Publication Data
US 2016/0333177 A1    Nov. 17, 2016

(30) Foreign Application Priority Data
Jan. 17, 2014    (JP) .................................. 2014-006906

(51) Int. Cl.
C08L 27/06    (2006.01)

(52) U.S. Cl.
CPC ........ *C08L 27/06* (2013.01); *C08K 2201/014* (2013.01); *C08L 2205/03* (2013.01)

(58) Field of Classification Search
CPC .................................................... C08L 27/06
See application file for complete search history.

(56) References Cited

U.S. PATENT DOCUMENTS

| | | | |
|---|---|---|---|
| 4,670,490 A | 6/1987 | Yoshida et al. | |
| 5,658,980 A | 8/1997 | Ichikawa | |
| 8,026,314 B2 | 9/2011 | Hansel et al. | |
| 2010/0062271 A1* | 3/2010 | Schattka | C08F 265/06 428/458 |
| 2016/0237297 A1 | 8/2016 | Kuwahara et al. | |
| 2016/0247597 A1* | 8/2016 | Kuwahara | H01B 3/443 |

FOREIGN PATENT DOCUMENTS

| | | | |
|---|---|---|---|
| IN | 201107383 A | * | 12/2012 |
| JP | 63-139927 A | | 6/1988 |
| JP | 02-218732 A | | 8/1990 |
| JP | 08-188691 A | | 7/1996 |
| JP | 11-060868 A | | 3/1999 |
| JP | 2001-200120 A | | 7/2001 |
| JP | 2001-234014 A | | 8/2001 |
| JP | 2002-179868 A | | 6/2002 |
| JP | 2003-171526 A | | 6/2003 |
| JP | 2005-255717 A | | 9/2005 |
| JP | 2007-277529 A | | 10/2007 |
| JP | 2008-208345 A | | 9/2008 |
| JP | 2010-058438 A | | 3/2010 |
| JP | 2012-140638 A | | 7/2012 |
| WO | 2010/119842 A1 | | 10/2010 |
| WO | 2015/045928 A1 | | 4/2015 |

OTHER PUBLICATIONS

Machine translation of JP 2005-255717 A, published Sep. 22, 2005.*
International Search Report issued in corresponding International application No. PCT/JP2015/050928 dated Apr. 14, 2015.
International Search Report issued in related International application No. PCT/JP2014/074317 dated Dec. 9, 2014.
Office Action issued in related U.S. Appl. No. 15/024,412 dated Oct. 5, 2016.
Final Office Action issued in related U.S. Appl. No. 15/024,412 dated Mar. 13, 2017.

* cited by examiner

*Primary Examiner* — Vickey Nerangis
(74) *Attorney, Agent, or Firm* — Morgan, Lewis & Bockius LLP

(57) ABSTRACT

The invention relates to a vinyl chloride resin composition and a vinyl chloride resin molded article obtained by molding the vinyl chloride resin composition, wherein the vinyl chloride resin composition contains a vinyl chloride resin (A), a stabilizer (B) as a compound containing at least one of calcium and zinc, and a processing auxiliary (C). The processing auxiliary (C) is a copolymer containing 19 mass % to 95 mass % of a methyl methacrylate monomer (c1) unit and 5 mass % to 81 mass % of an alkyl methacrylate monomer (c2) unit having a $C_3$-$C_5$ alkyl group.

14 Claims, No Drawings

VINYL CHLORIDE RESIN COMPOSITION AND VINYL CHLORIDE RESIN MOLDED ARTICLE

TECHNICAL FIELD

The invention relates to a vinyl chloride resin composition and a vinyl chloride resin molded article.

This application claims the priority benefit of Japanese Patent Application No. 2014-006906, filed on Friday, Jan. 17, 2014. The entirety of the above-mentioned patent application is hereby incorporated by reference herein and made a part of this specification.

BACKGROUND ART

The vinyl chloride resin used as the thermoplastic resin has excellent chemical resistance, impact resistance, and weatherability, and is cheap, and is therefore widely used as a high-value common resin material.

A stabilizer is generally used in the vinyl chloride resin. The stabilizer for the vinyl chloride resin is mostly lead stabilizer today, but issues exist in operating environment or operability. In particular, in the field of a hard vinyl chloride resin composition without a foaming agent (also referred to as "non-foaming vinyl chloride resin composition" hereinafter), such as in the applications of a vinyl chloride resin tube for cleaning water and a vinyl chloride resin tube for waste water, the use of a lead stabilizer is prohibited or has limited use.

Therefore, an organic tin stabilizer or a compound containing a metal such as calcium, zinc, or barium (such as a metal soap stabilizer) having few issues in operating environment or operability is used to replace the lead stabilizer. However, in recent years, the usage of the organic tin stabilizer has also been unfavorable, and a calcium-containing compound (Ca stabilizer), a zinc-containing compound (Zn stabilizer), and a calcium and zinc-containing compound (Ca—Zn stabilizer) have been extensively used.

For instance, patent literature 1 discloses a vinyl chloride resin composition in which a Ca—Zn stabilizer is used.

CITATION LIST

Patent Documents

Patent Document 1: JP 2008-208345

DISCLOSURE OF INVENTION

Problems to be Solved by the Invention

However, the Ca stabilizer, the Zn stabilizer, and the Ca—Zn stabilizer used as the stabilizer of a compound containing at least one of calcium and zinc tend to have worse thermal stability in comparison to the lead stabilizer or the organic tin stabilizer. Therefore, during the molding of the vinyl chloride resin composition containing the vinyl chloride resin and the stabilizer, the molding temperature cannot be increased. As a result, the disintegration of the vinyl chloride resin particles is insufficient. Moreover, the dispersion of the impact strength modifier is insufficient in the case that an impact strength modifier is mixed in the vinyl chloride resin composition, and as a result the mechanical properties of the molded article obtained are worse in comparison to the case in which the lead stabilizer or the organic tin stabilizer is used.

Moreover, the effects of the vinyl chloride resin composition recited in patent literature 1 may not be fully shown due to insufficient kneading of the vinyl chloride resin particles and dispersion of the impact strength modifier. Moreover, the processability of the vinyl chloride resin composition recited in patent literature 1 is also poor. Moreover, in patent literature 1, a processing auxiliary is not particularly disclosed.

The invention is achieved via the above, and the object thereof is to provide a vinyl chloride resin composition and a vinyl chloride resin molded article, wherein even if the vinyl chloride resin composition adopts a stabilizer as a compound containing at least one of calcium and zinc, a molded article having excellent mechanical properties can still be obtained, and the processability is good, and the mechanical properties of the vinyl chloride resin molded article are excellent.

Means to Solve the Problems

The invention has the following embodiments.

[1] A vinyl chloride resin composition contains a vinyl chloride resin (A), a stabilizer (B) as a compound containing at least one of calcium and zinc, and a processing auxiliary (C). The processing auxiliary (C) is a copolymer containing 19 mass % to 95 mass % of a methyl methacrylate monomer (c1) unit and 5 mass % to 81 mass % of an alkyl methacrylate monomer (c2) unit having a $C_3$-$C_5$ alkyl group.

[2] The vinyl chloride resin composition of [1], wherein the processing auxiliary (C) is a copolymer containing 19 mass % to 94 mass % of the methyl methacrylate monomer (c1) unit, 5 mass % to 80 mass % of the alkyl methacrylate monomer (c2) unit having a $C_3$-$C_5$ alkyl group, and 1 mass % to 20 mass % of other monomer (c3) units.

[3] The vinyl chloride resin composition of [1] or [2], wherein the processing auxiliary (C) is a copolymer containing an n-butyl methacrylate monomer unit as the alkyl methacrylate monomer (c2) unit having a $C_3$-$C_5$ alkyl group.

[4] The vinyl chloride resin composition of any of [1] to [3], wherein the processing auxiliary (C) is a copolymer containing 5 mass % to 60 mass % of the alkyl methacrylate monomer (c2) unit having a $C_3$-$C_5$ alkyl group.

[5] The vinyl chloride resin composition of [4], wherein the processing auxiliary (C) is a copolymer containing 18 mass % to 50 mass % of the alkyl methacrylate monomer (c2) unit having a $C_3$-$C_5$ alkyl group.

[6] The vinyl chloride resin composition of any of [1] to [5], wherein the processing auxiliary (C) is a copolymer containing 1 mass % to 20 mass % of an acrylate monomer unit as the other monomer (c3) units.

[7] The vinyl chloride resin composition of any of [1] to [6], wherein the processing auxiliary (C) is a copolymer containing 1 mass % to 10 mass % of the other monomer (c3) units.

[8] The vinyl chloride resin composition of [7], wherein the processing auxiliary (C) is a copolymer containing 1 mass % to 5 mass % of the other monomer (c3) units.

[9] The vinyl chloride resin composition of any of [1] to [8], wherein the stabilizer (B) is a compound containing both calcium and zinc.

[10] The vinyl chloride resin composition of any of [1] to [9], wherein the vinyl chloride resin composition does not contain a foaming agent.

[11] The vinyl chloride resin composition of any of [1] to [10], wherein the vinyl chloride resin composition further contains an impact strength modifier (D).

[12] The vinyl chloride resin composition of [11], wherein the impact strength modifier (D) contains at least one of acrylic rubber and silicone rubber.

[13] The vinyl chloride resin composition of any of [1] to [12], wherein based on 100 parts by mass of the vinyl chloride resin (A), the content of the stabilizer (B) is 0.1 parts by mass to 10.0 parts by mass and the content of the processing auxiliary (C) is 0.1 parts by mass to 10.0 parts by mass.

[14] The vinyl chloride resin composition of [11] or [12], wherein based on 100 parts by mass of the vinyl chloride resin (A), the content of the stabilizer (B) is 0.1 parts by mass to 10.0 parts by mass, the content of the processing auxiliary (C) is 0.1 parts by mass to 10.0 parts by mass, and the content of the impact strength modifier (D) is 0.5 parts by mass to 30.0 parts by mass.

[15] The vinyl chloride resin composition of [14], wherein based on 100 parts by mass of the vinyl chloride resin (A), the content of the impact strength modifier (D) is 4.0 parts by mass to 10.0 parts by mass.

[16] A vinyl chloride resin molded article obtained by molding the vinyl chloride resin composition of any of [1] to [15].

Moreover, in the processing auxiliary (C), the sum of the methyl methacrylate monomer (c1) unit, the alkyl methacrylate monomer (c2) unit having a $C_3$-$C_5$ alkyl group, and the other monomer (c3) units does not exceed 100 mass %.

Effects of the Invention

The vinyl chloride resin composition of the invention can achieve a molded article having excellent mechanical properties even if a stabilizer as a compound containing at least one of calcium and zinc is used, and processability is good.

The mechanical properties of the vinyl chloride resin molded article of the invention are excellent.

EMBODIMENTS FOR CARRYING OUT THE INVENTION

In the following, the invention is described in detail.

Moreover, in the following, "molded article" refers to a vinyl chloride resin molded article obtained by molding the vinyl chloride resin composition of the invention.

Moreover, "(meth)acrylic acid" is a general term for acrylic acid and methacrylic acid.

[Vinyl Chloride Resin Composition]

The vinyl chloride resin composition of the invention contains a vinyl chloride resin (A), a stabilizer (B), and a processing auxiliary (C). Moreover, the vinyl chloride resin composition preferably further contains an impact strength modifier (D).

<Vinyl Chloride Resin (A)>

The vinyl chloride resin (A) can include, for instance, a homopolymer of a vinyl chloride monomer (a1), or a copolymer of the vinyl chloride monomer (a1) and a monomer (a2) capable of copolymerizing with vinyl chloride for which the vinyl chloride monomer (a1) is used as the main component.

In the case that the vinyl chloride resin (A) is a copolymer, based on a sum of 100 mass % of all of the structural units forming the copolymer, the content of the vinyl chloride monomer (a1) unit is preferably 10 mass % to 99 mass %, more preferably 50 mass % to 99 mass %.

Any monomer having a reactive double bond in the molecules can be used for the monomer (a2) capable of copolymerizing with vinyl chloride, and can include, for instance: α-olefin such as ethylene, propylene, or butylene; vinyl ester such as vinyl acetate or vinyl propionate; vinyl ether such as butyl vinyl ether or cetyl vinyl ether; unsaturated carboxylic acid such as acrylic acid or methacrylic acid; ester of acrylic acid or methacrylic acid such as methyl acrylate, methyl methacrylate, ethyl acrylate, ethyl methacrylate, butyl acrylate, butyl methacrylate, phenyl acrylate, or phenyl methacrylate; vinyl halide other than vinyl chloride such as vinylidene chloride or fluorinated ethylene; and N-substituted maleimide such as N-phenylmaleimide or N-cyclohexylmaleimide.

The homopolymer or the copolymer of the vinyl chloride monomer (a1) can be obtained via any known polymerization method such as a suspension polymerization method, emulsion polymerization, a solution polymerization method, or block polymerization.

The vinyl chloride resin (A) can be used alone and can also be used in a combination of 2 or more.

The average degree of polymerization of the vinyl chloride resin (A) is preferably 500 to 3000, more preferably 500 to 2000, and still more preferably 500 to 1500. If the average degree of polymerization of the vinyl chloride resin (A) is 500 or more, then the mechanical properties of the molded article obtained are further improved. Moreover, if the average degree of polymerization of the vinyl chloride resin (A) is 3000 or less, then the processability of the vinyl chloride resin composition tends to be better.

The value of the average degree of polymerization of the vinyl chloride resin (A) is the catalog value of the manufacturer or a value obtained from a known formula such as Mark-Houwink-Sakurada.

<Stabilizer (B)>

The stabilizer (B) provides thermal stability during the mold processing of the vinyl chloride resin composition.

The stabilizer (B) is a compound containing at least one of calcium and zinc. In terms of providing higher thermal stability to the vinyl chloride resin composition, the stabilizer (B) is preferably a compound containing both calcium and zinc.

Moreover, in terms of providing higher thermal stability to the vinyl chloride resin composition, the stabilizer (B) is preferably metal soap containing at least one of calcium and zinc, more preferably a Ca—Zn stabilizer containing both Ca metal soap and Zn metal soap.

The compound forming the stabilizer (B) can include, for instance, calcium salt of long chain fatty acid (Ca stabilizer), zinc salt of long chain fatty acid (Zn stabilizer), and a mixture of Ca stabilizer and Zn stabilizer (Ca—Zn stabilizer).

The long chain fatty acid can include, for instance: butyric acid, pentanoic acid, hexanoic acid, heptanoic acid, caprylic acid, nonanoic acid, decanoic acid, lauric acid, myristic acid, pentadecanoic acid, palmitic acid, isostearic acid, stearic acid, oleic acid, linoleic acid, ricinoleic acid, octylic acid, arachidic acid, arachidonic acid, behenic acid, lignoceric acid, and montanic acid.

The stabilizer (B) can be used alone and can also be used in a combination of two or more.

Based on 100 parts by mass of the vinyl chloride resin (A), the content of the stabilizer (B) is preferably 0.1 parts by mass to 10.0 parts by mass, more preferably 0.5 parts by mass to 10.0 parts by mass, still more preferably 0.5 parts by mass to 8.0 parts by mass, and still yet more preferably 1.0 part by mass to 6.0 parts by mass. If the content of the stabilizer (B) is 0.1 parts by mass or more, then the improving effect of thermal stability of the vinyl chloride resin (A) is more significant. Moreover, if the content of the stabilizer (B) is 10.0 parts by mass or less, then coloring of the molded article can be inhibited. Moreover, since the vinyl chloride resin (A) is sufficiently melted and kneaded, the mechanical properties of the molded article are further improved.

<Processing Auxiliary (C)>

The processing auxiliary (C) reduces the gelation time of the vinyl chloride resin composition and provides melt elasticity during mold processing, so as to improve the processability and the appearance of the molded article.

The processing auxiliary (C) is a copolymer of the methyl methacrylate monomer (c1), the alkyl methacrylate monomer (c2) having a $C_3$-$C_5$ alkyl group, and the optional other monomers (c3). That is, the processing auxiliary (C) is a copolymer containing 19 mass % to 95 mass % of the methyl methacrylate monomer (c1) unit and 5 mass % to 81 mass % of the alkyl methacrylate monomer (c2) unit having a $C_3$-$C_5$ alkyl group, and is preferably a copolymer containing 19 mass % to 94 mass % of the methyl methacrylate monomer (c1) unit, 5 mass % to 80 mass % of the alkyl methacrylate monomer (c2) unit having a $C_3$-$C_5$ alkyl group, and 1 mass % to 20 mass % of the other monomer (c3) units.

The compatibility of the methyl methacrylate (c1) and the vinyl chloride resin (A) is good.

Based on a sum of 100 mass % of all of the structural units forming the copolymer (processing auxiliary (C)), the content of the methyl methacrylate monomer (c1) unit is 19 mass % to 95 mass %, preferably 19 mass % to 94 mass %, more preferably 40 mass % to 94 mass %, and still more preferably 50 mass % to 82 mass %. If the content of the methyl methacrylate monomer (c1) unit is 19 mass % or more, then the compatibility with the vinyl chloride resin (A) tends to be good, and the vinyl chloride resin (A) can be sufficiently kneaded, such that processability is increased. Moreover, if the content of the methyl methacrylate monomer (c1) unit is 95 mass % or less, then the molecules of the processing auxiliary (C) are easily dispersed in the vinyl chloride resin (A), such that the mechanical properties of the molded article are improved.

The alkyl methacrylate monomer (c2) having a $C_3$-$C_5$ alkyl group can include, for instance: propyl methacrylate, n-butyl methacrylate, isobutyl methacrylate, and amyl methacrylate. Among these, in terms of further improving the processability of the vinyl chloride resin composition, n-butyl methacrylate and isobutyl methacrylate are preferred, and n-butyl methacrylate is more preferred.

The alkyl methacrylates can be used alone and can also be used in a combination of two or more based on the object.

Based on a sum of 100 mass % of all of the structural units forming the copolymer (processing auxiliary (C)), the content of the alkyl methacrylate monomer (c2) unit having a $C_3$-$C_5$ alkyl group is 5 mass % to 81 mass %, preferably 5 mass % to 80 mass %, more preferably 5 mass % to 60 mass %, still more preferably 10 mass % to 60 mass %, still yet more preferably 12 mass % to 50 mass %, and most preferably 18 mass % to 50 mass %. If the content of the alkyl methacrylate monomer (c2) unit having a $C_3$-$C_5$ alkyl group is 5 mass % or more, then the molecules of the processing auxiliary (C) are easily dispersed in the vinyl chloride resin (A), such that the mechanical properties of the molded article are improved. Moreover, the molding appearance of the molded article is good. Moreover, if the content of the alkyl methacrylate monomer (c2) unit having a $C_3$-$C_5$ alkyl group is 81 mass % or less, then the compatibility with the vinyl chloride resin (A) tends to be good, and the vinyl chloride resin (A) can be sufficiently kneaded, such that processability is increased. In particular, when the sum of all of the structural units forming the copolymer (processing auxiliary (C)) is set to 100 mass %, the alkyl methacrylate monomer (c2) unit having a $C_3$-$C_5$ alkyl group preferably contains 5 mass % to 81 mass % of an n-butyl methacrylate monomer unit, more preferably 5 mass % to 80 mass %, still more preferably 5 mass % to 60 mass %, still yet more preferably 10 mass % to 60 mass %, still yet more preferably 12 mass % to 50 mass %, and most preferably 18 mass % to 50 mass %.

The other monomers (c3) are not particularly limited as long as the other monomers (c3) can be copolymerized with the methyl methacrylate monomer (c1) and the alkyl methacrylate monomer (c2) having a $C_3$-$C_5$ alkyl group. For instance, the following can be included: acrylate such as methyl acrylate, ethyl acrylate, n-butyl acrylate, 2-ethylhexyl acrylate, benzyl acrylate, or phenyl acrylate; methacrylate such as ethyl methacrylate, 2-ethylhexyl methacrylate, benzyl methacrylate, or phenyl methacrylate; an aromatic vinyl compound such as styrene, α-methylstyrene, or vinyltoluene; a vinyl cyanide compound such as acrylonitrile or methacrylonitrile; vinyl ester such as vinyl acetate; and anhydride such as maleic anhydride. Among these, the processability of acrylate such as ethyl acrylate, n-butyl acrylate, 2-ethylhexyl acrylate, benzyl acrylate, or phenyl acrylate in the vinyl chloride resin composition and the mechanical properties of the molded article obtained are better. In particular, based on 100 mass % of the other monomers (c3), 50 mass % to 100 mass % of n-butyl acrylate is preferably used as the other monomers (c3).

The monomers can be used alone and can also be used in a combination of two or more based on the object.

Based on a sum of 100 mass % of all of the structural units forming the copolymer (processing auxiliary (C)), the content of the other monomer (c3) units is preferably 0 mass % to 20 mass %, more preferably 1 mass % to 20 mass %, still more preferably 1 mass % to 10 mass %, and still yet more preferably 1 mass % to 5 mass %. If the content of the other monomer (c3) units is 1 mass % or more, then the thermal decomposition resistance of the processing auxiliary (C) is good. Moreover, if the content of the other monomer (c3) units is 20 mass % or less, then melting and kneading of the vinyl chloride resin (A) can be efficiently performed, and the processability of the vinyl chloride resin composition and the mechanical properties of the molded article are improved. In particular, based on a sum of 100 mass % of all of the structural units forming the copolymer (processing auxiliary (C)), the other monomer (c3) units preferably contains 1 mass % to 20 mass % of an acrylate monomer unit, more preferably 1 mass % to 10 mass %, and still more preferably 1 mass % to 5 mass %.

(Manufacturing Method of Processing Auxiliary (C))

The method of manufacturing the processing auxiliary (C) can include various polymerization methods such as emulsion polymerization, suspension polymerization, and solution polymerization. Moreover, the monomer can also be added all at once/dropwise or added in batches, and a random copolymerization or a block copolymerization can also be used, but the processing auxiliary (C) is preferably a random copolymer obtained by adding the monomer all at once.

For instance, in the case that the processing auxiliary (C) is manufactured using an emulsion polymerization method, the emulsifier used in the emulsion polymerization method is not particularly limited, and various emulsifiers can be used, such as: an anionic surfactant such as fatty acid salt, alkyl sulfate, alkyl benzene sulfonate, alkyl phosphate, or dialkyl sulfosuccinate; a non-ionic surfactant such as polyoxyethylene alkyl ether, polyoxyethylene fatty acid ester, sorbitan fatty acid ester, or glycerol fatty acid ester; and a cationic surfactant such as alkyl ammonium salt. The emulsifiers can be used alone and can also be used in a combination of two or more.

Moreover, when the pH of the polymerization system is on the alkaline side based on the type of the emulsifier used in the emulsion polymerization method, to prevent hydrolysis of alkyl methacrylate, a suitable pH regulator can also be used.

The pH regulator can include, for instance: boric acid-potassium chloride-potassium hydroxide, potassium dihydrogen phosphate-disodium hydrogen phosphate, boric acid-potassium chloride-potassium carbonate, citric acid-potassium hydrogen citrate, potassium dihydrogen phosphate-borax, and disodium hydrogen phosphate-citric acid.

Moreover, the polymerization initiator used in the manufacture of the processing auxiliary (C) can include, for instance, a water-soluble or oil-soluble single or oxidation-reduction polymerization initiator. Specifically, a conventional inorganic polymerization initiator such as persulfate can be used alone, or the inorganic polymerization initiator can also be used in combination with, for instance, sulfite, bisulfate, or thiosulfate as the redox initiator. Moreover, organic peroxide or an azo compound such as tert-butyl hydroperoxide, cumene hydroperoxide, benzoyl peroxide, or lauroyl peroxide can be used alone, or the above can also be combined with, for instance, sodium formaldehyde sulfoxylate as a redox initiator, but the invention is not limited to these examples.

The method of recycling the processing auxiliary (C) in powder form is not particularly limited, and in the case that the processing auxiliary (C) is manufactured using an emulsion polymerization method, the resulting latex of the copolymer can be cooled, and then acid coagulation or salting is performed via an electrolyte such as an acid such as sulfuric acid, hydrochloric acid, or phosphoric acid or salt such as aluminum chloride, calcium chloride, magnesium sulfate, aluminum sulfate, or calcium acetate to precipitate a copolymer. Then, filtering, washing, and drying were performed to obtain the processing auxiliary (C).

Moreover, the processing auxiliary (C) can also be recycled in powder form using various methods such as spray drying and freeze drying. In particular, in terms of easily obtaining a molded article having good appearance, spray drying is preferred.

The conditions of spray drying are not particularly limited, and spray drying can be performed under any condition, but preferably, in the powder formed by spray drying, the content of powder fused inside the particles thereof in a homogeneous state is less than 50 mass %, more preferably less than 25 mass %.

The molecular weight of the processing auxiliary (C) is not particularly limited, but to achieve better effect, the reduced viscosity $\eta sp$ thereof is preferably set to 0.1 to 1.5, more preferably 0.2 to 1.0, and still more preferably 0.3 to 0.9.

Moreover, "reduced viscosity $\eta sp$" in the invention refers to the value measured at 25° C. by dissolving 0.1 g of a polymer or a copolymer in 100 mL of chloroform.

The method of adjusting the reduced viscosity $\eta sp$ can include common methods such as regulating the usage amounts of the chain-transfer agent and the polymerization initiator during polymerization and regulating the polymerization temperature.

The processing auxiliary (C) can be used alone and can also be used in a combination of two or more.

Based on 100 parts by mass of the vinyl chloride resin (A), the content of the processing auxiliary (C) is preferably 0.1 parts by mass to 10.0 parts by mass, more preferably 0.3 parts by mass to 7.0 parts by mass, and still more preferably 0.5 parts by mass to 6.0 parts by mass. If the content of the processing auxiliary (C) is 0.1 parts by mass or more, then the processability of the vinyl chloride resin composition is further increased. Moreover, if the content of the processing auxiliary (C) is 10.0 parts by mass or less, then the mechanical properties of the molded article can be maintained good.

<Impact Strength Modifier (D)>

The impact strength modifier (D) can include, for instance: rubber graft copolymer, acrylonitrile-butadiene rubber (NBR), ethylene-vinyl acetate copolymer (EVA), chlorinated polyethylene, and thermoplastic elastomer.

The rubber graft copolymer can include, for instance: acrylic rubber graft copolymer, silicone rubber graft copolymer, composite rubber graft copolymer of silicone rubber and acrylic rubber, methyl methacrylate-butadiene-styrene copolymer (MBS), acrylonitrile-butadiene-styrene copolymer (ABS), and acrylonitrile-ethylene propylene rubber-styrene copolymer (AES).

In terms of maintaining good weatherability for the molded article, the impact strength modifier (D) preferably contains at least one of acrylic rubber and silicone rubber. The impact strength modifier (D) can specifically include, for instance, acrylic rubber graft copolymer, silicone rubber graft copolymer, and composite rubber graft copolymer of silicone rubber and acrylic rubber.

The acrylic rubber graft copolymer contains a rubber portion formed by acrylic rubber and a graft portion bonded to the rubber portion.

The acrylic rubber is obtained by polymerizing (meth)acrylate and optional other vinyl monomers capable of copolymerizing with (meth)acrylate.

(Meth)acrylate can include, for instance: methyl (meth)acrylate, ethyl (meth)acrylate, propyl (meth)acrylate, n-butyl (meth)acrylate, isobutyl (meth)acrylate, 2-ethylhexyl (meth)acrylate, and 4-hydroxybutyl (meth)acrylate.

The other vinyl monomers can include, for instance: an aromatic vinyl monomer such as styrene, α-methylstyrene, or vinyltoluene; cyanide vinyl monomer such as (meth)acrylonitrile; and fluorine-containing vinyl monomer.

The monomer forming the graft portion adopts the monomer (graft monomer) capable of copolymerizing with acrylic rubber.

Such a graft monomer can include, for instance: an aromatic vinyl monomer such as styrene or α-methylstyrene; acrylate such as ethyl acrylate or n-butyl acrylate; methacrylate such as methyl methacrylate or ethyl methacrylate; cyanide vinyl monomer such as (meth)acrylonitrile; and a crosslinking monomer such as allyl (meth)acrylate, diallyl phthalate, diallyl sebacate, or triallyl triazine.

The acrylic rubber graft copolymer is obtained by adding one or more graft monomers forming the graft portion in the presence of the latex of acrylic rubber and reacting the mixture in graft polymerization.

The silicone rubber graft copolymer contains a rubber portion formed by silicone rubber and a graft portion bonded to the rubber portion.

The silicone rubber can include polyorganosiloxane. The polyorganosiloxane is obtained by polymerizing, for instance, dimethyl siloxane, siloxane containing a vinyl polymerizable functional group, and optional siloxane crosslinking agent.

Dimethyl siloxane can include, for instance, dimethyl siloxane cyclic body having a three-numbered ring or above, preferably a dimethyl siloxane cyclic body having a three-numbered ring to a seven-membered ring. Specifically, the following can be included: hexamethylcyclotrisiloxane, octamethylcyclotetrasiloxane, decamethylcyclopentasiloxane, and dodecamethylcyclohexasiloxane.

The siloxane containing a vinyl polymerizable functional group can include, for instance: methacryloyloxy silane such as β-methacryloyloxy ethyl dimethoxymethyl silane or γ-methacryloyloxy propyl dimethoxymethyl silane; vinyl siloxane such as tetramethyltetravinyl cyclotetrasiloxane; vinyl phenyl silane such as p-vinyl phenyl dimethoxy methyl silane; and mercapto siloxane such as γ-mercaptopropyl dimethoxymethyl silane or γ-mercaptopropyl trimethoxy silane.

The siloxane crosslinking agent is preferably trifunctional or tetrafunctional silane crosslinking agent, and can include, for instance: trimethoxy methyl silane, triethoxy phenyl silane, tetramethoxy silane, tetraethoxy silane, and tetrabutoxy silane.

The monomer forming the graft portion adopts a monomer (graft monomer) capable of copolymerizing with silicone rubber.

Such a graft monomer can adopt the graft monomer exemplified in the description of the acrylic rubber graft copolymer.

The silicone rubber graft copolymer is obtained by adding one or more graft monomers forming the graft portion in the presence of the latex of silicone rubber and reacting the mixture in graft polymerization.

The composite rubber graft copolymer contains a rubber portion formed by the composite rubber of silicone rubber and acrylic rubber and a graft portion bonded to the rubber portion.

The composite rubber can be obtained by, for instance, adding a (meth)acrylate component in the latex of polyorganosiloxane and performing polymerization using a conventional polymerization initiator.

The polyorganosiloxane can adopt the polyorganosiloxane exemplified in the description of silicone rubber above.

The (meth)acrylate component can adopt the (meth)acrylate exemplified in the description of the acrylic rubber above.

The monomer forming the graft portion adopts a monomer (graft monomer) capable of copolymerizing with the composite rubber of silicone rubber and acrylic rubber.

Such a graft monomer can adopt the graft monomer exemplified in the description of the acrylic rubber graft copolymer.

The composite rubber graft copolymer is obtained by adding one or more graft monomers forming the graft portion in the presence of the latex of the composite rubber of silicone rubber and acrylic rubber and reacting the mixture in graft polymerization.

The impact strength modifier (D) can be used alone and can also be used in a combination of two or more.

Based on 100 parts by mass of the vinyl chloride resin (A), the content of the impact strength modifier (D) is preferably 0.5 parts by mass to 30.0 parts by mass, more preferably 1.0 part by mass to 20.0 parts by mass, and still more preferably 4.0 parts by mass to 10.0 parts by mass. If the content of the impact strength modifier (D) is 0.5 parts by mass or more, then the mechanical properties of the molded article are improved. Moreover, if the content of the impact strength modifier (D) is 30.0 parts by mass or less, then reduction in the fluidity of the vinyl chloride resin composition during melting and the elastic modulus of the molded article can be inhibited.

<Other Components>

The vinyl chloride resin composition can contain other additives other than the vinyl chloride resin (A), the stabilizer (B), the processing auxiliary (C), and the impact strength modifier (D).

The other additives can include, for instance: a filler, a thermal stabilizer (other than the stabilizer (B)), a plasticizer, a lubricant, a flame retardant, a heat resistance improver, a mold release agent, a flowability improver, a colorant, an antistatic agent, a conductivity imparting agent, an antifogging agent, and an antibacterial agent.

Moreover, in the case that the vinyl chloride resin composition is used in a non-foaming field, the vinyl chloride resin composition preferably does not contain a foaming agent.

The filler can include, for instance, the following: carbonate such as heavy calcium carbonate; an inorganic filler such as titanium oxide, clay, talc, mica, silicon dioxide, or glass bead; a carbon filler such as carbon black or graphite; a natural organic substance such as wood powder; an organic filler such as silicone; inorganic fiber such as glass fiber or metal fiber; carbon fiber; and organic fiber such as polyamide.

The filler can be used alone and can also be used in a combination of two or more.

The thermal stabilizer is preferably 1 or more selected from the group consisting of a hydrotalcite thermal stabilizer, a tin thermal stabilizer, and a zeolite thermal stabilizer. The thermal stabilizer is used to improve the thermal decomposition, long-run properties, and the appearance of the molded article during molding.

Based on 100 parts by mass of the vinyl chloride resin (A), the thermal stabilizer is preferably 0.1 parts by mass to 10.0 parts by mass, more preferably 0.2 parts by mass to 5.0 parts by mass.

The hydrotalcite thermal stabilizer is a hydrotalcite compound, and specifically is a complex salt compound containing magnesium and/or alkali metal and aluminum, or a complex salt compound containing zinc, magnesium, and aluminum for which crystal water is dehydrated. Moreover, the hydrotalcite compound can be a natural substance or a synthetic product, and the synthesis method of the synthesis product can adopt a known method.

The thermal stabilizer can be used alone and can also be used in a combination of two or more.

The plasticizer can include, for instance: a phthalate-based plasticizer such as diheptyl phthalate, dioctyl phthalate, or diisononyl phthalate; an adipate plasticizer such as dioctyl adipate, diisononyl adipate, or di(butyl diglycol) adipate; a phosphate plasticizer; a polyester plasticizer; a chlorinated paraffin plasticizer; a trimellitate plasticizer such as trioctyl trimellitate or tri($C_7$-$C_9$ mixed alkyl) trimellitate; a pyromellitate plasticizer such as tetraoctyl pyromellitate; and a biphenyl tetracarboxylate plasticizer.

The plasticizer can be used alone and can also be used in a combination of two or more.

The lubricant can include, for instance: a pure hydrocarbon lubricant such as liquid wax, natural wax, micro wax, synthetic wax, or low molecular weight polyethylene wax; a halogenated hydrocarbon lubricant; a fatty acid lubricant such as higher fatty acid or hydroxy fatty acid; a fatty acid amide lubricant such as fatty acid amide or di-fatty acid amide; an ester lubricant such as polyol ester of fatty acid such as lower alcohol ester of fatty acid or glyceride, polyglycol of fatty acid, or fatty alcohol ester (ester wax) of fatty acid; and metal soap (other than the stabilizer (B)), fatty alcohol, polyol, polyethylene glycol, polyglycerol, partial ester of fatty acid and polyol, and the partial ester of fatty acid, polyethylene glycol, and polyglycerol.

The lubricant can be used alone and can also be used in a combination of two or more.

The flame retardant can be, for instance, chlorinated paraffin, aluminum hydroxide, antimony trioxide, and halide.

The flame retardant can be used alone and can also be used in a combination of two or more.

The heat resistance improver can be, for instance, a (meth)acrylate copolymer, an imide copolymer, and a styrene-acrylonitrile copolymer.

The heat resistance improving agent can be used alone and can also be used in a combination of two or more.

<Manufacturing Method of Vinyl Chloride Resin Composition>

The vinyl chloride resin composition is obtained via, for instance, the following method: the vinyl chloride resin (A), the stabilizer (B), the processing auxiliary (C), and the optional impact strength modifier (D) or other additives are mixed and then the mixture is melted and kneaded.

The mixing method can adopt, for instance, a method using a super mixer or a Henschel mixer.

The melting and kneading method can include, for instance, a method using an extruder, a Banbury mixer, a roller, or a kneader.

The mixing or melting and kneading operation can also be performed in batches or be performed continuously. The mixing order of the vinyl chloride resin (A), the stabilizer (B), the processing auxiliary (C), the impact strength modifier (D), and the other additives is not particularly limited.

<Effects>

The vinyl chloride resin composition of the invention contains the specific processing auxiliary (C), and therefore even if a stabilizer used as a compound containing at least one of calcium and zinc is used, a molded article having excellent mechanical properties can still be obtained, and the processability is good.

Moreover, the vinyl chloride resin composition of the invention contains the stabilizer (B) used as a compound containing at least one of calcium and zinc, and therefore the operating environment or the operability is excellent.

[Vinyl Chloride Resin Molded Article]

The vinyl chloride resin molded article of the invention is obtained by molding the vinyl chloride resin composition of the invention.

The molding method includes, for instance: profile extrusion molding, injection molding, vacuum molding, blow molding, roll molding, and press molding. Among these, profile extrusion molding is preferred.

The vinyl chloride resin molded article of the invention is formed by molding the vinyl chloride resin composition of the invention, and therefore the mechanical properties are excellent.

The vinyl chloride resin molded article can be applied in a wide variety of areas such as in a building material such as window frame, various items such as pipes, rain gutters, profile molded articles, automotive materials, toys, and office supplies, and office automation equipment and home electric appliances.

EXAMPLES

In the following, the invention is specifically described via examples. However, the invention is not limited to the examples.

Moreover, "parts" in each example and comparative example represents "parts by mass". The various tests and evaluation methods are as follows.

[Tests and Evaluations]

<Measurement of Reduced Viscosity>

0.1 g of a processing auxiliary was dissolved in 100 mL of chloroform, and the reduced viscosity ($\eta$sp) was measured using an Ubbelohde viscometer at 25° C.

<Evaluation of Processability>

A vinyl chloride resin composition was filled in a Brabender Plasti Corder at 170° C. in the amount of 100 mL, and the condition was kept for 2 minutes, and then gelation was observed under the conditions of a measuring temperature of 170° C. and a revolution of 30 rpm. The time required from the observation of gelation until a torque of over 30 N·m was read as the gelation time. A shorter gelation time represents better processability.

<Evaluation Method of Mechanical Properties>

A vinyl chloride resin composition was put into a 25 mm single-screw extruder (made by Thermo-Plastics Industry), the cylinder temperature was set to C1–C2–C3–D=160° C.-180° C.-190° C.-190° C., and pelletization was performed under the condition of a screw rotation of 50 rpm to obtain a vinyl chloride resin composition in particle form.

The resulting vinyl chloride resin composition in particle form was put into a 30 mm single-screw extruder (made by GM ENGINEERING), and the cylinder temperature was set to C1-C2-C3-C4-C5-A-D=60° C.-160° C.-170° C.-180° C.-190° C.-190° C.-190° C., and then a square bar was molded using a mold having a width of 10 mm and a thickness of 5 mm under the condition of a screw rotation of 30 rpm.

The obtained square bar was cut into a length of 80 mm, and the Charpy impact strength was measured according to JIS K 7111-1:2012 (ISO 179-1).

[Manufacture of Processing Auxiliary]

<Manufacture of Processing Auxiliary (C-1)>

180 parts of ion exchange water was added in a reaction vessel provided with a stirrer and a reflux condenser, and 0.1 parts of anhydrous sodium carbonate, 68 parts of methyl methacrylate, 3 parts of n-butyl acrylate, 29 parts of n-butyl methacrylate, and 0.004 parts of n-octyl mercaptan were added thereto, and then replacement was performed inside the reaction vessel using nitrogen. Then, 1.1 parts of sodium lauryl sulfate (made by Kao Corp., "Emal 2F") as emulsifier was added, and the reaction vessel was heated to 45° C. while stirring, and then 0.15 parts of potassium persulfate as the polymerization initiator was added to perform a polymerization reaction. The mixture was heated and stirred for 2 hours to end the polymerization so as to obtain a latex.

After the resulting latex was cooled, spray drying was performed under the conditions of an inlet temperature of 160° C. and an outlet temperature of 70° C. to obtain a powdered processing auxiliary (C-1).

The reduced viscosity of the processing auxiliary (C-1) obtained was measured. The results are shown in Table 1.

<Manufacture of Processing Auxiliaries (C-2) to (C-6)>

The amount of each monomer added was changed as shown in Table 1. Moreover, powdered processing auxiliaries (C-2) to (C-6) were obtained with the same method as the processing auxiliary (C-1).

The reduced viscosities of the processing auxiliaries (C-2) to (C-6) obtained were measured. The results are shown in Table 1.

TABLE 1

| | Processing auxiliary (C) | | | | | |
|---|---|---|---|---|---|---|
| | C-1 | C-2 | C-3 | C-4 | C-5 | C-6 |
| MMA [parts] | 68 | 81 | 68 | 95.7 | 80 | 70 |
| nBMA [parts] | 29 | 15 | 0 | 0 | 0 | 30 |
| iBMA [parts] | 0 | 0 | 29 | 0 | 0 | 0 |
| nBA [parts] | 3 | 4 | 3 | 4.3 | 20 | 0 |
| nOM [parts] | 0.004 | 0.004 | 0.004 | 0.004 | 0 | 0.004 |
| Reduced viscosity [ηsp] | 0.61 | 0.69 | 0.64 | 0.73 | 0.79 | 0.71 |

The abbreviations in Table 1 are as follows.
[MMA]: methyl methacrylate
[nBMA]: n-butyl methacrylate
[iBMA]: isobutyl methacrylate
[nBA]: n-butyl acrylate
[nOM]: n-octyl mercaptan

Example 1

100 parts of a vinyl chloride resin (made by Shin-Etsu Chemical Co., Ltd., "TK-1000") having an average degree of polymerization of 1000, 2 parts of a mixture of calcium stearate and zinc stearate (made by SUNACE) as the Ca—Zn stabilizer, 1 part of the processing auxiliary (C-1), 7 parts of an acrylic rubber graft copolymer (made by Mitsubishi Rayon Co., Ltd., "Metablen W-450A") as the impact strength modifier (D), 0.4 parts of an ester lubricant (made by Emery Oleochemicals Japan, "LOXIOL VPN933") and 0.4 parts of polyethylene wax (made by Emery Oleochemicals Japan, "LOXIOL VPN233") as the lubricant were mixed, and the mixture was dried using a Henschel mixer until 110° C. to obtain a vinyl chloride resin composition.

Evaluation was performed on the processability of the resulting vinyl chloride resin composition. Moreover, a molded article (square bar) was made using the vinyl chloride resin composition, and the mechanical properties thereof were evaluated. The results are shown in Table 2.

Example 2 to Example 6 and Comparative Example 1 to Comparative Example 4

The type and the amount of the processing auxiliary (C) added and the amount of the impact strength modifier (D) added were changed as shown in Table 2. Moreover, the vinyl chloride resin composition was prepared with the same method as example 1, and evaluation of processability and mechanical properties was performed. The results are shown in Table 2.

Based on the results of Table 2, the gelation time of the vinyl chloride resin composition obtained in each example is short, and the processability is good. Moreover, molded articles having excellent mechanical properties are obtained from the vinyl chloride resin compositions. In particular, in comparison to the vinyl chloride resin composition of example 4 in which the processing auxiliary (C-6) without the other monomer (c3) units is used, the gelation time of the vinyl chloride resin compositions of example 1 to example 3, example 5, and example 6 in which the processing auxiliary (C-1), the processing auxiliary (C-2), or the processing auxiliary (C-3) containing a specific amount of the other monomer (c3) units is used is less, and molded articles having better mechanical properties are obtained.

Therefore, the following conclusion can be drawn: the vinyl chloride resin composition of the invention can achieve a molded article having excellent mechanical properties even if a stabilizer as a compound containing at least one of calcium and zinc is used, and processability is good.

Moreover, the gelation time of the vinyl chloride resin compositions of comparative example 1 to comparative example 4 in which the processing auxiliary (C-4) or the processing auxiliary (C-5) without the alkyl methacrylate monomer (c2) unit having a $C_3$-$C_5$ alkyl group is used is long, and the processability is worse. Moreover, the mechanical properties of the molded article obtained via the vinyl chloride resin composition are also poor.

INDUSTRIAL APPLICABILITY

The vinyl chloride resin composition of the invention can be applied in a building material such as window frame, various items such as pipes, rain gutters, profile molded articles, automotive materials, toys, and office supplies, and materials such as office automation equipment and home electric appliances.

The invention claimed is:
1. A vinyl chloride resin composition comprising:
a vinyl chloride resin (A),
a stabilizer (B) containing both calcium and zinc, and
a processing auxiliary (C),
wherein the processing auxiliary (C) is a copolymer containing 19 mass % to 94 mass % of a methyl methacrylate monomer (c1) unit, 5 mass % to 80 mass % of an alkyl methacrylate monomer (c2) unit having a $C_3$-$C_5$ alkyl group, and 1 mass % to 20 mass % of an acrylate monomer unit as other monomer (c3) units, while containing no i-butyl methacrylate monomer unit,

TABLE 2

| | | Example 1 | Example 2 | Example 3 | Example 4 | Example 5 | Example 6 | Comparative example 1 | Comparative example 2 | Comparative example 3 | Comparative example 4 |
|---|---|---|---|---|---|---|---|---|---|---|---|
| Composition [parts] | | | | | | | | | | | |
| Vinyl chloride resin (A) | TK-1000 | 100 | 100 | 100 | 100 | 100 | 100 | 100 | 100 | 100 | 100 |
| Stabilizer (B) | Ca—Zn stabilizer | 2 | 2 | 2 | 2 | 2 | 2 | 2 | 2 | 2 | 2 |
| Processing auxiliary (C) | Type | C-1 | C-2 | C-3 | C-6 | C-1 | C-1 | C-4 | C-5 | C-5 | C-5 |
| | Quantity | 1 | 1 | 1 | 1 | 2 | 2 | 1 | 1 | 2 | 2 |
| Impact strength modifier (D) | Acrylic rubber graft copolymer | 7 | 7 | 7 | 7 | 5 | 7 | 7 | 7 | 5 | 7 |
| Other additives | Ester lubricant | 0.4 | 0.4 | 0.4 | 0.4 | 0.4 | 0.4 | 0.4 | 0.4 | 0.4 | 0.4 |
| | Polyethylene wax | 0.4 | 0.4 | 0.4 | 0.4 | 0.4 | 0.4 | 0.4 | 0.4 | 0.4 | 0.4 |
| Gelation time [seconds] | | 264 | 246 | 290 | 322 | 260 | 240 | 456 | 430 | 410 | 408 |
| Charpy impact strength [kJ/m$^2$] | | 15.1 | 13.8 | 14.8 | 11.6 | 18.7 | 28.8 | 10.9 | 9.8 | 13.3 | 15.2 | wherein the alkyl methacrylate monomer (c2) unit having a $C_3$-$C_5$ alkyl group is a n-butyl methacrylate monomer unit, and wherein the vinyl chloride resin composition does not contain a foaming agent.

2. The vinyl chloride resin composition of claim 1, wherein the processing auxiliary (C) is a copolymer containing 5 mass % to 60 mass % of the alkyl methacrylate monomer (c2) unit having a $C_3$-$C_5$ alkyl group.

3. The vinyl chloride resin composition of claim 2, wherein the processing auxiliary (C) is a copolymer containing 18 mass % to 50 mass % of the alkyl methacrylate monomer (c2) unit having a $C_3$-$C_5$ alkyl group.

4. The vinyl chloride resin composition of claim 1, wherein the processing auxiliary (C) is a copolymer containing 1 mass % to 10 mass % of the other monomer (c3) units.

5. The vinyl chloride resin composition of claim 4, wherein the processing auxiliary (C) is a copolymer containing 1 mass % to 5 mass % of the other monomer (c3) units.

6. The vinyl chloride resin composition of claim 1, wherein the vinyl chloride resin composition further contains an impact strength modifier (D).

7. The vinyl chloride resin composition of claim 6, wherein the impact strength modifier (D) contains at least one of acrylic rubber and silicone rubber.

8. The vinyl chloride resin composition of claim 6, wherein based on 100 parts by mass of the vinyl chloride resin (A), a content of the stabilizer (B) is 0.1 parts by mass to 10.0 parts by mass, a content of the processing auxiliary (C) is 0.1 parts by mass to 10.0 parts by mass, and a content of the impact strength modifier (D) is 0.5 parts by mass to 30.0 parts by mass.

9. The vinyl chloride resin composition of claim 8, wherein based on 100 parts by mass of the vinyl chloride resin (A), a content of the impact strength modifier (D) is 4.0 parts by mass to 10.0 parts by mass.

10. The vinyl chloride resin composition of claim 1, wherein based on 100 parts by mass of the vinyl chloride resin (A), a content of the stabilizer (B) is 0.1 parts by mass to 10.0 parts by mass and a content of the processing auxiliary (C) is 0.1 parts by mass to 10.0 parts by mass.

11. The vinyl chloride resin composition of claim 1, wherein the stabilizer (B) comprises a mixture of: (i) one or more of a calcium salt of a long chain fatty acid; and (ii) one or more of a zinc salt of a fatty acid, wherein the fatty acid is selected from the group consisting of butyric acid, pentanoic acid, hexanoic acid, heptanoic acid, caprylic acid, nonanoic acid, decanoic acid, lauric acid, myristic acid, pentadecanoic acid, palmitic acid, isostearic acid, stearic acid, oleic acid, linoleic acid, ricinoleic acid, octylic acid, arachidic acid, arachidonic acid, behenic acid, lignoceric acid, and montanic acid.

12. The vinyl chloride resin composition of claim 1, wherein the processing auxiliary (C) has a reduced viscosity nsp of 0.1 to 1.5 ml/g, wherein the reduced viscosity nsp is a value measured at 25° C. by dissolving 0.1 g of a polymer or a copolymer in 100 mL of chloroform.

13. The vinyl chloride resin composition of claim 12, wherein the processing auxiliary (C) has a reduced viscosity nsp of 0.2 to 1.0 ml/g.

14. A vinyl chloride resin molded article obtained by molding the vinyl chloride resin composition of claim 1.

* * * * *